US008749835B2

(12) United States Patent
Tojima

(10) Patent No.: US 8,749,835 B2
(45) Date of Patent: Jun. 10, 2014

(54) IMAGE PROCESSING APPARATUS AND IMAGE PROCESSING METHOD

(75) Inventor: Kenzo Tojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 13/217,119

(22) Filed: Aug. 24, 2011

(65) Prior Publication Data

US 2012/0062907 A1    Mar. 15, 2012

(30) Foreign Application Priority Data

Sep. 10, 2010  (JP) ................................. 2010-202882

(51) Int. Cl.
G06K 15/02    (2006.01)
G06K 15/00    (2006.01)

(52) U.S. Cl.
USPC .......... 358/1.2; 358/540; 358/448; 348/240.1

(58) Field of Classification Search
USPC ....................................................... 358/1.2
See application file for complete search history.

(56) References Cited

U.S. PATENT DOCUMENTS

| 4,833,535 | A | * | 5/1989 | Ozeki et al. ................. 348/400.1 |
| 5,383,754 | A | * | 1/1995 | Sumida et al. ................... 412/11 |
| 6,088,138 | A | * | 7/2000 | Sakai et al. .................... 358/540 |
| 2004/0056880 | A1 | * | 3/2004 | Matsuoka et al. ............. 345/716 |
| 2004/0161264 | A1 | * | 8/2004 | Shirai et al. .................... 399/196 |
| 2009/0279108 | A1 | * | 11/2009 | Hoshi et al. ..................... 358/1.2 |
| 2010/0013960 | A1 | * | 1/2010 | Ishii ........................... 348/240.1 |
| 2011/0066678 | A1 | * | 3/2011 | Yano ............................... 709/203 |

FOREIGN PATENT DOCUMENTS

| JP | 6-121116 A | 4/1994 |
| JP | 2003-259092 A | 9/2003 |
| JP | 2010088007 | * 4/2010 |

OTHER PUBLICATIONS

JP-2010-088007, English language equivalent Apr. 2010.*

* cited by examiner

*Primary Examiner* — Benny Q Tieu
*Assistant Examiner* — Daryl Jackson
(74) *Attorney, Agent, or Firm* — Fitzpatrick, Cella, Harper & Scinto

(57) ABSTRACT

An image processing apparatus sets a variable-magnification ratio of image data, discriminates whether or not the set variable-magnification ratio is larger than a predetermined threshold value, and decides a memory size of a memory device for storing the image data in accordance with a discrimination result in the discriminating. The Apparatus stores the image data of an amount corresponding to the decided memory size into the memory device, and executes a variable-magnification process to the image data stored in the memory device by using the set variable-magnification ratio.

10 Claims, 10 Drawing Sheets

IMAGE PROCESSING APPARATUS AND IMAGE PROCESSING METHOD

BACKGROUND OF THE INVENTION

1. Field of the Invention

The present invention relates to an image processing technique for performing a variable-magnification process on an image.

2. Description of the Related Art

Hitherto, an image processing apparatus such as a digital color copying apparatus or the like has widely been known. According to such an image processing apparatus, light is irradiated to an original, its reflection light is read by a photoelectric converting device such as a CCD or the like, and various kinds of image processes such as a variable-magnification processing and the like can be executed to a read signal. As a method of irradiating the light to the original, it is possible to construct in such a manner that the original is fixed and an optical system is moved or the optical system is fixed and the original is conveyed. When the original is read by the image processing apparatus such as a digital color copying apparatus or the like, a linear image sensor in which photodiodes are arranged in a line and photoelectric converting devices such as CCDs or the like are arranged in parallel is generally used.

Hitherto, in the foregoing variable-magnification process, the magnification in the main scanning direction is realized by an image process by using the signal read by the linear image sensor. The magnification in the sub-scanning direction as a moving direction of the optical system is realized by scanning the reading optical system to the original at a low speed upon magnification or at a high speed upon reduction. According to such a method, within a control range of a motor to scan the optical system, since a driving speed can be finely adjusted, a relatively stable image signal can be obtained.

By using a buffer memory of a predetermined capacity, the magnification in the sub-scanning direction can be also realized by the image process in a manner similar to the magnification in the main scanning direction. In this case, a construction in which the signal read by the linear image sensor is temporarily stored into the buffer memory of the predetermined capacity, a CPU, dedicated hardware, or the like reads out the signal temporarily stored in the buffer memory, and the variable-magnification process is executed is generally used. According to such a construction, a scanning speed of the optical system can be held constant, control of a motor to scan the optical system can be simplified, and the reasonable motor can be used.

In association with the above technique, Japanese Patent Application Laid-Open No. H06-121116A discloses such a technique that a desired variable-magnification ratio in the sub-scanning direction is realized by combining a magnification in the sub-scanning direction which is performed by controlling a driving speed of a line sensor and a magnification in the main scanning direction which is performed by an image process. Japanese Patent Application Laid-Open No. 2003-259092A discloses such a technique that at a predetermined magnification or more, a scanning speed of an optical system is controlled, at a magnification less than the predetermined magnification, the scanning speed of the optical system is held constant, a photosensing time of a linear image sensor is controlled, and a magnification in the sub-scanning direction is performed.

However, in the case where the scanning speed of the optical system is held constant and the magnification by the image process is executed, if the magnification exceeds the predetermined variable-magnification ratio upon magnification, the buffer memory will overflow. For example, when the variable-magnification ratio is equal to 200%, a data amount is increased by four times after the variable-magnification process. Therefore, a communication speed which is permitted to the input side to a magnification processing unit prior to the variable-magnification process is equal to ¼ of a communication speed at the time of a direct copying mode of the variable-magnification ratio of 100%. Therefore, a reading speed from the buffer memory is also equal to ¼ of a reading speed at the time of the direct copying mode of the variable-magnification ratio of 100%. On the other hand, since the scanning speed of the optical system is held constant, a writing speed into the buffer memory cannot be reduced. Thus, the writing speed into the buffer memory is higher than the reading speed from the buffer memory and the buffer memory overflows.

Therefore, a method whereby the signal read by the linear image sensor is stored into the buffer memory of such a capacity that the overflow cannot occur and, thereafter, the variable-magnification process by the image process is executed is considered. The buffer memory of such a capacity that the overflow cannot occur is a ring buffer or a page memory in which RAW data is stored. However, according to such a method, the buffer memory of a large capacity is necessary and even if the data is multivalue compressed by a JPEG or the like and, thereafter, stored into the buffer memory, in the case of the whole one page, the data amount is sufficiently large and the buffer memory of the large capacity is necessary.

The invention is made to solve the foregoing problems and it is an object of the invention to provide an image processing apparatus in which even if a scanning speed of an optical system is held constant, a use amount of a buffer memory can be reduced.

SUMMARY OF THE INVENTION

In order to solve the problem discussed above, the invention provides with an image processing apparatus having a memory device for storing image data, the image processing apparatus comprising: a setting unit that sets a variable-magnification ratio of image data; a discriminating unit that discriminates whether or not the variable-magnification ratio set by the setting unit is larger than a predetermined threshold value; a deciding unit that decides a memory size of the memory device for storing the image data in accordance with a discrimination result by the discriminating unit; a storing unit that stores the image data of an amount corresponding to the memory size decided by the deciding unit into the memory device; and a variable-magnification processing unit that executes a variable-magnification process to the image data stored in the memory device by using the variable-magnification ratio set by the setting unit.

According to the invention, even if the scanning speed of the optical system is held constant, the memory size of the memory device can be switched in accordance with the variable-magnification ratio, and the capacity of the memory device can be reduced as compared with the case where the memory size is uniformed.

Another object of the invention is to provide a novel function. Claims and other features of the invention to accomplish the above objects will be apparent from the following description and drawings.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the invention will be described in detail hereinbelow with reference to the drawings.

Figure 1:
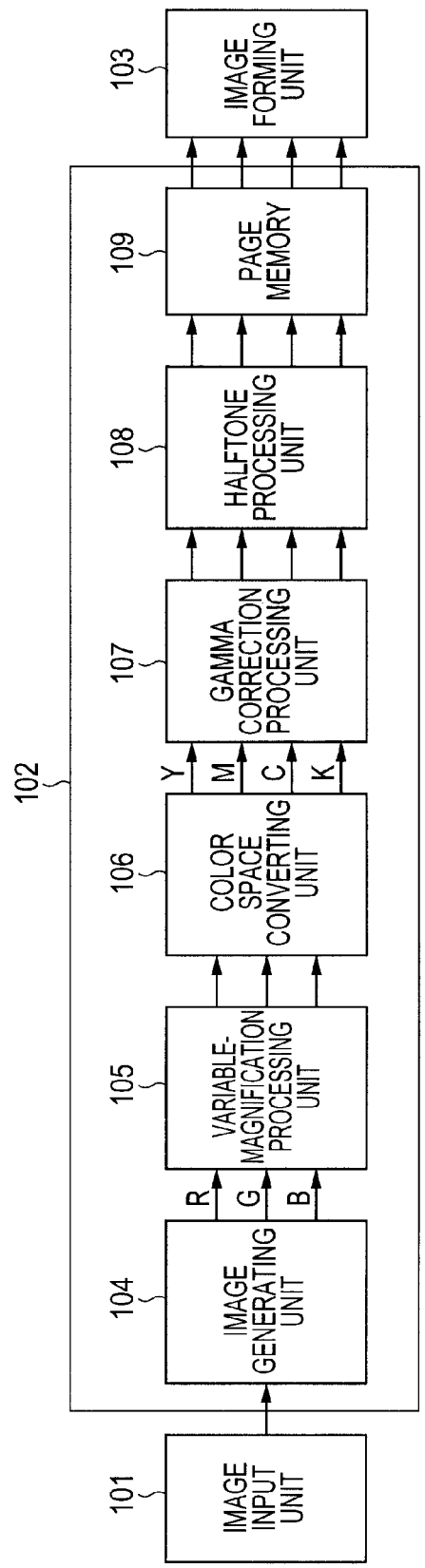
FIG. 1 is a functional block diagram illustrating a constructional example of an image forming apparatus in which an image processing apparatus to which the invention is applied is installed.

FIG. 1 is a functional block diagram illustrating a constructional example of an image forming apparatus in which an image processing apparatus to which the invention is applied is installed. The illustrated image forming apparatus is constructed mainly by an image input unit 101, an image processing unit 102 (image processing apparatus), and an image forming unit 103.

The image input unit 101 inputs image data based on an image to be formed. For example, the image input unit 101 is constructed by a scanner apparatus for optically reading an image of an original put onto a platen glass and inputting image data corresponding to the read image. Or, the image input unit 101 is constructed by a communication function unit for receiving image data of an image (to be formed) which has been transmitted from an external apparatus through a network, a telephone line, or the like and inputting the received image data. Since a scanning speed of an optical system for reading the original is constant as a prerequisite of the embodiment, the speed cannot be reduced or the optical system cannot be stopped during the reading operation. Therefore, the image input unit 101 has a real-time restriction.

Figure 2:
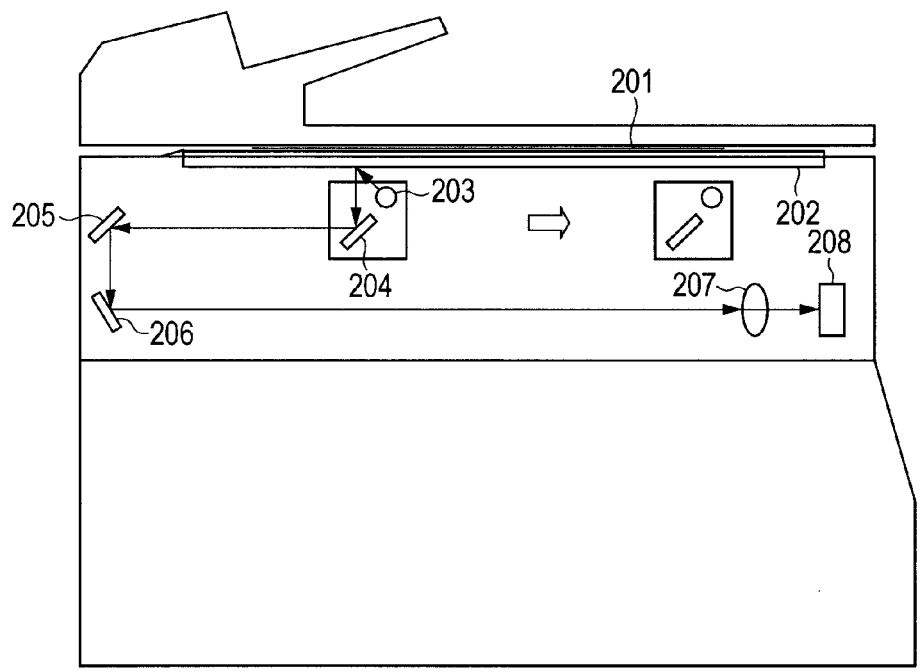
FIG. 2 is a vertical sectional view schematically illustrating a constructional example of an image input apparatus to which the invention is applied.
Figure 3:
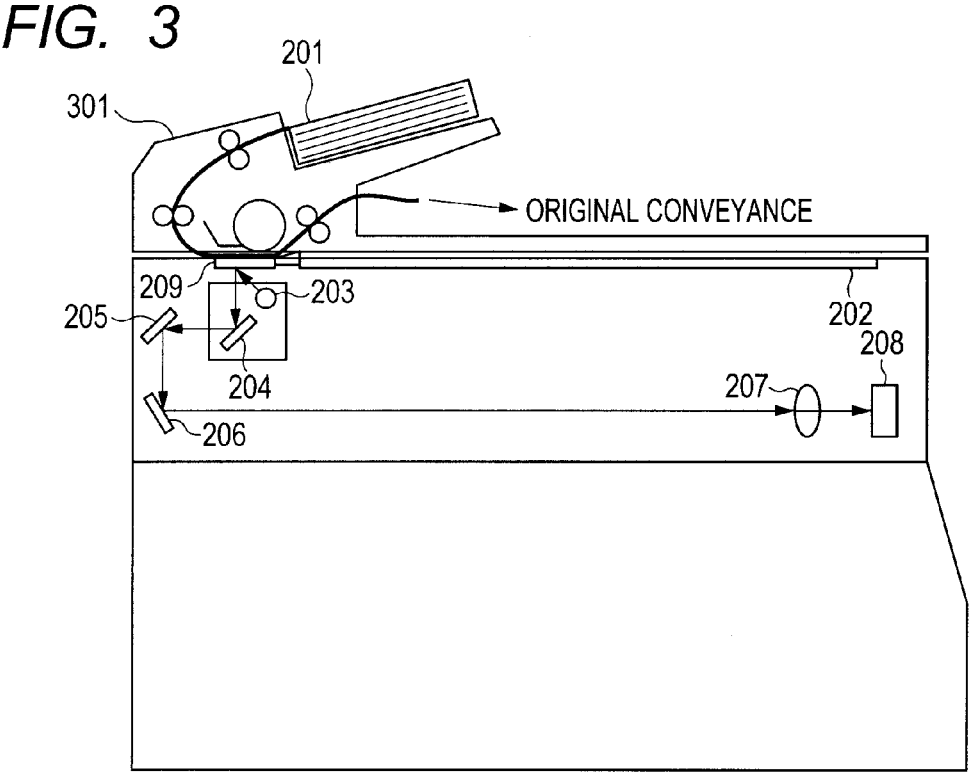
FIG. 3 is a vertical sectional view schematically illustrating another constructional example of an image input apparatus to which the invention is applied.

FIGS. 2 and 3 are vertical sectional views each schematically illustrating a construction of the scanner apparatus using a linear image sensor for optically reading the original image.

The scanner apparatus of FIG. 2 has: an original 201; a platen glass 202; an illumination lamp 203; mirrors 204 to 206; a lens 207; and a linear image sensor 208. The linear image sensor 208 reads the original by scanning the illumination lamp 203 and the mirror 204 in the sub-scanning direction.

The scanner apparatus of FIG. 3 has: the original 201; the platen glass 202; the illumination lamp 203; the mirrors 204 to 206; the lens 207; and the linear image sensor 208. The original 201 is fed by an automatic document feeder (ADF) 301 as illustrated in the diagram. The original reading operation by the linear image sensor 208 is realized by reading, through contact glass 209, the original 201 which moves in the sub-scanning direction.

Each of those scanner apparatuses may be a monochromatic scanner apparatus for inputting a monochromatic image or a color scanner apparatus for inputting a color image.

The image processing unit 102 executes various kinds of image processes to the image data input by the image input unit 101. For this purpose, the image processing unit 102 has an image generating unit 104, a variable-magnification processing unit 105, a color space converting unit 106, a gamma correction processing unit 107, a halftone processing unit 108, and a page memory 109.

The image generating unit 104 forms raster image data which can be print-processed from the input image data and outputs the raster image data as image data of R (red), G (green), and B (blue) every pixel. The variable-magnification processing unit 105 magnifies/reduces the RGB data generated by the image generating unit 104 in accordance with a magnification (copy magnification or the like) set through a user interface (UI) (control panel or the like) (not shown). The color space converting unit 106 converts the RGB image data which was magnified/reduced by the variable-magnification processing unit 105 into image data of Y (yellow), M (magenta), C (cyan), and K (black) by a converting process of a color space based on, for example, an L*a*b* colorimetric system. The gamma correction processing unit 107 corrects the YMCK image data which was converted by the color space converting unit 106 to gradation characteristics suitable for image creation. The halftone processing unit 108 executes a pseudo halftone process to the YMCK image data corrected by the gamma correction processing unit 107 in accordance with necessity. When the image input unit 101 is the scanner apparatus, an error diffusion process or the like is executed. When the image input unit 101 is an external apparatus such as a host computer or the like, a screen process or the like is executed.

The image processing unit 102 may be constructed so as to execute a monochromatic image process in accordance with a construction of the image input unit 101 and the image forming unit 103 or execute the color image process as mentioned above.

The image forming unit 103 forms the image onto the medium on the basis of the image data processed by the image processing unit 102 (image processing apparatus). The image forming unit 103 may be an electrophotographic system using toner for development or an ink jet system using ink.

The image forming unit 103 may form the monochromatic image or form the full color image.

<Embodiment 1>

Figure 4:
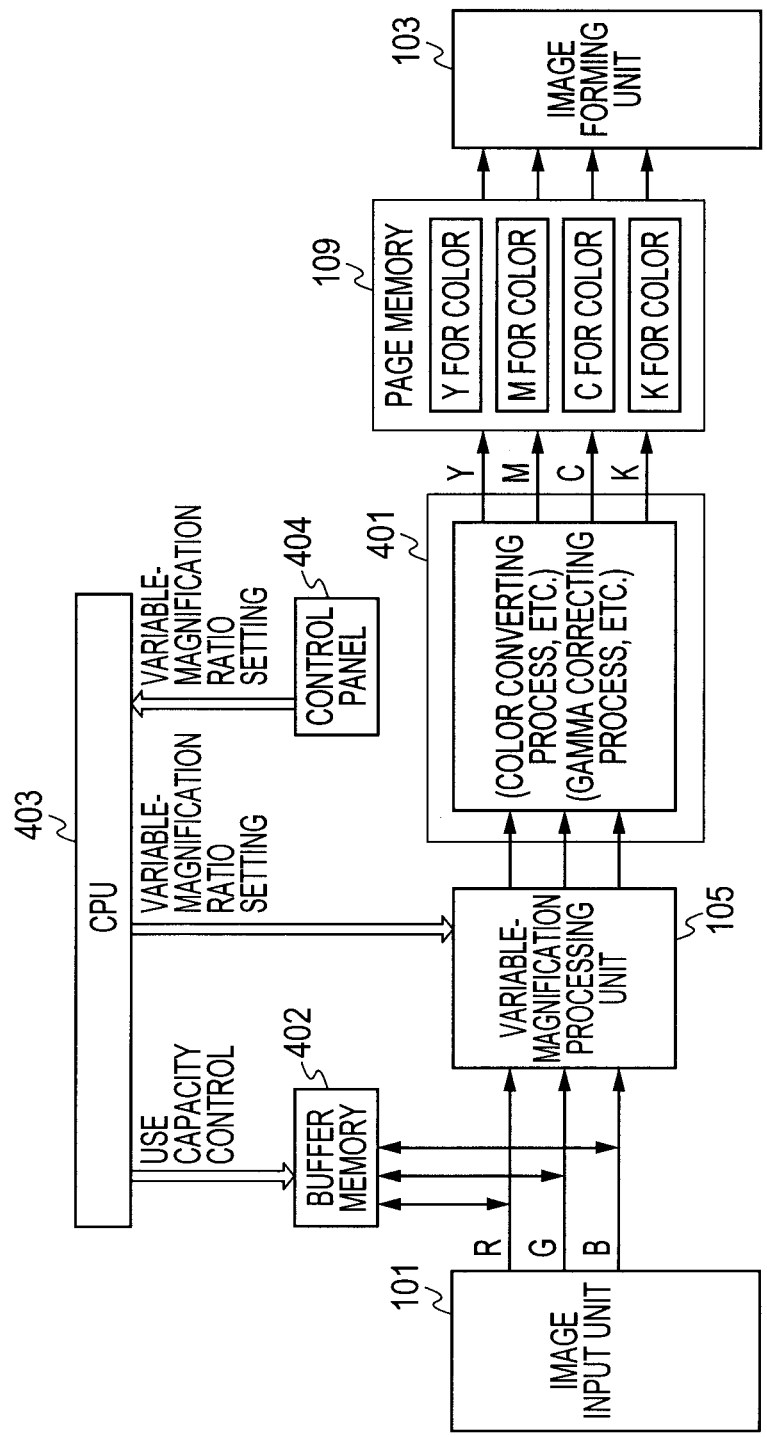
FIG. 4 is a functional block diagram of a color image forming apparatus according to an embodiment 1.

FIG. 4 is a functional block diagram of a color image forming apparatus in which the image processing apparatus according to the embodiment 1 has been installed. In the color image forming apparatus in which the image processing apparatus has been installed, an image processing unit 401 includes the color space converting unit 106, gamma correction processing unit 107, and the like in FIG. 1 and finally forms the YMCK image data adapted to form a color image. The page memory 109 stores the color image forming YMCK image data formed by the image processing unit 401 every color. A buffer memory 402 (memory device) serving as a buffer memory device is a ring buffer in which the RGB image data which was input from the image input unit 101 is temporarily stored as non-compression RAW data. A control panel 404 serving as a variable-magnification ratio setting unit is a user interface by which the user can make various kinds of print settings. A variable-magnification ratio is set through the control panel 404. A CPU 403 serving as a buffer storage amount switching unit switches a memory size of the buffer memory 402 (memory device) in accordance with the variable-magnification ratio set through the control panel 404. In addition, the CPU 403 sets the variable-magnification ratio into the variable-magnification processing unit 105 in accordance with the variable-magnification ratio.

A threshold value of the variable-magnification ratio which is determined to a predetermined value in order to switch a use capacity of the buffer memory 402 is referred to as a "threshold variable-magnification ratio".

In the embodiment, when the variable-magnification ratio set through the control panel 404 is equal to or less than the threshold variable-magnification ratio (threshold value), the storage amount of the line memories each for storing the image data of one line corresponding to the necessary least number of lines is assured as a first buffer storage amount. As for the necessary least number of lines, if there are not any other restrictions, two lines are theoretically enough. If a processing restriction of a unit of 8×8 blocks or the like exists in an algorithm of the variable-magnification processing unit 105, 16 lines are necessary.

When the variable-magnification ratio is larger than the threshold variable-magnification ratio (threshold value), the storage amount corresponding to one page of the image before the variable-magnification process at the threshold variable-magnification ratio is assured as a second buffer storage amount. It is assumed that the threshold variable-magnification ratio has been decided by the CPU 403 serving as a threshold variable-magnification ratio deciding unit, an external apparatus (not shown), or the like and stored in a register or the like of the memory (not shown) serving as a threshold variable-magnification ratio memory device.

Details of a procedure for deciding the threshold variable-magnification ratio and switching the capacity of the buffer memory 402 will be described hereinbelow. Variables A, A', B, B', C, D, E, F, G, H, and I which are necessary for description will be also defined hereinbelow.

Communication speed of the image input unit 101=A [Mega pixels/second]

Maximum communication speed of the image input unit 101=A' [Mega pixels/second]

Variable-magnification ratio of the variable-magnification processing unit 105=B [%]

Upper limit variable-magnification ratio which can be processed by the variable-magnification processing unit 105=B' [%]

Maximum communication speed of the output side of the variable-magnification processing unit 105=C [Mega pixels/second]

Threshold variable-magnification ratio=D [%]

The number of original images which can be input per minute of the image input unit 101=E [images/minute]

The number of pixels which can be read per original of the image input unit 101=F [Mega pixels]

Ratio of the read original images of the image input unit 101=G [%]

(Ratio of the intervals among the read original images of the image input unit 101=(100−G) [%])

The number of clock cycles necessary for the variable-magnification processing unit 105 to output one pixel=H [Cycles]

Operating clock frequency of the variable-magnification processing unit 105=I [MHz]

The communication speed A of the image input unit 101 is decided by the following equations (1) and (2) if the image input unit 101 is, for example, the scanner apparatus as illustrated in FIG. 3.

(1) When B≤100%, $$A=(E/60) \times F \times (100/G) \tag{1}$$

(2) When B ≥ 100%, $$A=(E/60) \times F \times (100/G) \times (100/B) \tag{2}$$

The equation (1) indicates the maximum communication speed A' of the image input unit 101 and becomes as shown by the following equation (3).

$$A'=(E/60) \times F \times (100/G) \tag{3}$$

That is, from the equations (1) and (3), at the time of the reducing process in which the variable-magnification ratio B of the variable-magnification processing unit 105 is equal to or less than 100%, the communication speed A of the image input unit 101 is equal to the maximum communication speed A' of the image input unit 101. This is because at the time of the reducing process in the embodiment, the image input unit 101 reads all of the pixels which can be read per original. From the equations (2) and (3), at the time of the magnifying process in which the variable-magnification ratio B of the variable-magnification processing unit 105 is larger than 100%, the communication speed A of the image input unit 101 decreases in inverse proportion to the variable-magnification ratio B to the maximum communication speed A' of the image input unit 101. This is because at the time of the magnifying process in the embodiment, a main scanning width of the original which is read by the image input unit 101 decreases in inverse proportion to the variable-magnification ratio B.

Figure 5:
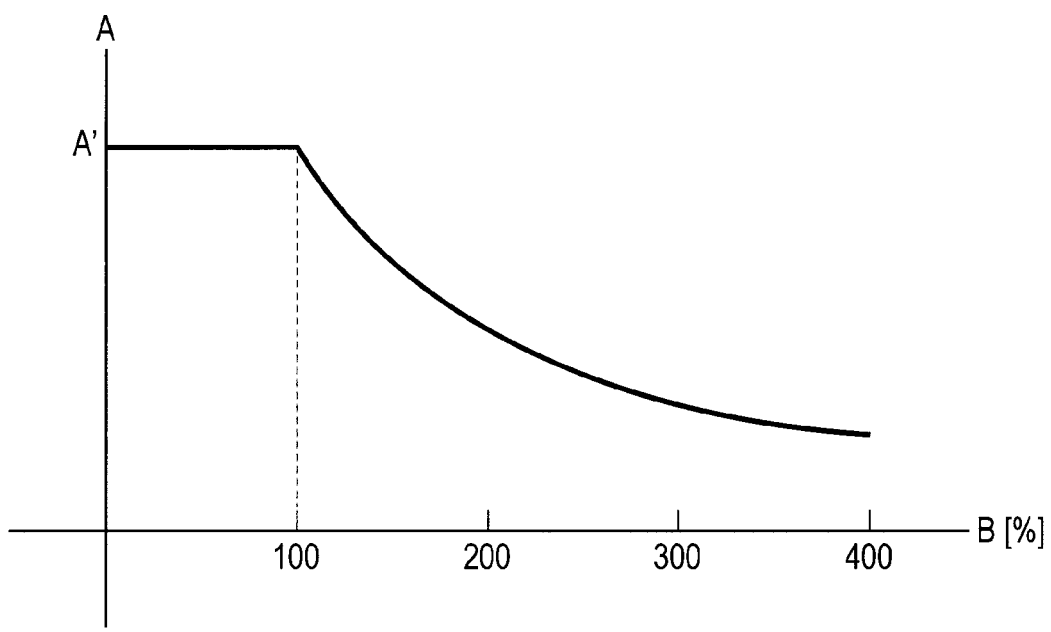
FIG. 5 is a graph illustrating a relation between a communication speed A of an image input unit and a variable-magnification ratio B of a variable-magnification processing unit in the image forming apparatus according to embodiments 1 to 4.

A graph showing a relation between the communication speed A of the image input unit 101 and the variable-magnification ratio B of the variable-magnification processing unit 105 is illustrated in FIG. 5.

The maximum communication speed C of the output side of the variable-magnification processing unit 105 is decided by the following equation (4).

$$C=(I/H) \tag{4}$$

The upper limit variable-magnification ratio B' which can be processed by the variable-magnification processing unit 105 is decided as follows. First, the communication speed which is required to the output side of the variable-magnification processing unit 105 is shown by the following expression (5).

$$A \times (B/100) \times (B/100) \tag{5}$$

That is, since the image data is magnified in both of the main scanning direction and the sub-scanning direction, a data amount (communication speed which is required to the output side of the variable-magnification processing unit 105) increases in proportion to the square of the variable-magnification ratio B to the communication speed A of the image input unit 101 (communication speed on the input side of the variable-magnification processing unit 105). For example, when the variable-magnification ratio is equal to 200%, the data amount is increased by four times. When the variable-magnification ratio is equal to 400%, the data amount is increased by 16 times.

The communication speed which is required to the output side of the variable-magnification processing unit 105 and is shown by the expression (5) must not exceed the maximum communication speed C of the output side of the variable-magnification processing unit 105 shown by the equation (4). Therefore, it is necessary that the variable-magnification ratio B of the variable-magnification processing unit 105 satisfies the following inequality (6) whose left side is the expression (5).

$$A \times (B/100) \times (B/100) \leq C \qquad (6)$$

The following inequality (7) is obtained by substituting the equation (2) into A in the inequality (6). In the image forming apparatus to which the invention can be applied, since the upper limit variable-magnification ratio B' which can be processed by the variable-magnification processing unit 105 is larger than 100%, the equation (2) is substituted in place of the equation (1) here.

$$(E/60) \times F \times (100/G) \times (B/100) \leq C \qquad (7)$$

From the inequality (7), as the variable-magnification ratio B of the variable-magnification processing unit 105 increases, inequality signs of the inequalities (6) and (7) are reversed at a threshold value of a certain variable-magnification ratio B as a boundary. That is, the communication speed exceeds the maximum communication speed C of the output side of the variable-magnification processing unit 105. In other words, a processing ability exceeds an upper limit of a processing ability of the output side of the variable-magnification processing unit 105. It is, therefore, necessary to reduce the communication speed A of the image input unit 101 so as to satisfy the inequalities (6) and (7). However, since the scanner apparatus serving as an image input unit 101 has the real-time restriction, an operating speed cannot be reduced or the operation cannot be stopped. It is impossible to satisfy the inequalities (6) and (7).

Therefore, the variable-magnification ratio B which satisfies the following equation (8) in which the right side and the left side of the inequality (7) are equal becomes the upper limit variable-magnification ratio B' which can be processed by the variable-magnification processing unit 105.

$$(E/60) \times F \times (100/G) \times (B'/100) = C \qquad (8)$$

By simplifying the equation (8) by using the equation (3), the following equation (9) is obtained.

$$A' \times (B'/100) = C \qquad (9)$$

In other words, the variable-magnification ratio at the time when a value obtained by multiplying the maximum communication speed of the image input unit 101 by the variable-magnification ratio of the variable-magnification processing unit 105 is equal to the maximum communication speed of the output side of the variable-magnification processing unit 105 becomes the upper limit variable-magnification ratio B' which can be processed by the variable-magnification processing unit 105.

By modifying the equation (8), the upper limit variable-magnification ratio B' which can be processed by the variable-magnification processing unit 105 is decided by the following equation (10).

$$B' = C \times (60/E) \times (1/F) \times G \qquad (10)$$

The threshold variable-magnification ratio D is arbitrarily determined within a range shown by the following inequality (11).

$$D \leq B' \qquad (11)$$

The threshold variable-magnification ratio D is decided to a value as large as possible within a range of B' or less (upper limit or less) in consideration of an influence by disturbance such as a latency of the memory or the like which depends on an image processing system. For example, if B' is equal to 222% and a margin of about 22% is necessary so that the buffer memory does not certainly overflow, D is decided to 200% or the like. Although it is a very rare case that the user designates the variable-magnification ratio within a range from 201% to 222%, 200% is a variable-magnification ratio from the A5 size to the A3 size and is relatively frequently used.

Finally, the use amount of the buffer memory 402 is determined by the CPU 403 in accordance with the following reference.

(1) When B≤D

The storage amount of the line memories corresponding to the necessary least number of lines is assured as a first buffer storage amount.

(2) When B>D

The storage amount corresponding to one page of the image before the variable-magnification process at the threshold variable-magnification ratio D is assured as a second buffer storage amount.

The foregoing selection of the capacity of the buffer memory will be described hereinbelow by showing specific numerical values.

For example, it is now assumed that the A3 scanner apparatus having a scan resolution of 600 [dpi] operates at a rate of 40 [images/minute] and at an image interval ratio of 30 [%] and the variable-magnification processing unit which can output the pixel every cycle operates at a clock frequency of 148 [MHz]. The "image interval ratio" is a terminology corresponding to a ratio (=(100−F) [%]) of the intervals of the read original images of the scanner apparatus. The number of pixels of the image of the A3 size and 600 [dpi] is assumed to be 70 [Mega pixels] (7000 [pixels]×10000 [pixels]). Those numerical values correspond to the following variables.

The number of original images which can be input per minute of the image input unit 101=E [images/minute]=40

The number of read pixels per original of the image input unit 101=F [Mega pixels]=70

Ratio of the read original images of the image input unit 101=G [%]=70

(Ratio of the intervals of the read original images of the image input unit 101=(100−G) [%])=30

The number of clock cycles necessary for the variable-magnification processing unit 105 to output one pixel=H [Cycles]=1

Operating clock frequency of the variable-magnification processing unit 105=I [MHz]=148

The communication speed C of the output side of the variable-magnification processing unit 105 is determined by the following equation (4).

$$C=(I/H) \quad (4)$$

$$C=(148/1)$$

$$C=148 \text{ [Mega pixels/second]}$$

The upper limit variable-magnification ratio B' which can be processed by the variable-magnification processing unit 105 is decided by the following equation (10).

$$B'=C\times(60/E)\times(1/F)\times G \quad (10)$$

$$B'=148\times(60/40)\times(1/70)\times 70$$

$$B'=222 \text{ [%]}$$

The threshold variable-magnification ratio D can be arbitrarily determined within the range shown by the following inequality (11).

$$D \leq B' \quad (11)$$

$$D \leq 222$$

The threshold variable-magnification ratio D is set to the following value in consideration of the foregoing margin.

$$D=200 \text{ [%]}$$

Finally, the use amount of the buffer memory 402 is determined by the CPU 403 in accordance with the following reference.

(1) When B≤200 [%]

The storage amount of the line memories corresponding to the necessary least number of lines is assured as a first buffer storage amount. The storage amount corresponding to the necessary least number of lines is equal to the amount of 2 lines or 16 lines as mentioned above.

Assuming that each color of RGB is equal to 1 byte and one pixel is equal to 3 bytes, the memory capacity of one line is equal to 21000 [Bytes]=21 [Kilobytes] as a value obtained by increasing 7000 [pixels] by 3 times. Therefore, in the case of the storage amount of 2 lines, the capacity of the buffer memory 402 which should be assured by the CPU 403 is equal to 42 [Kilobytes] as a value obtained by increasing 21 [Kilobytes] by 2 times. In the case of the storage amount of 16 lines, the capacity of the buffer memory 402 which should be assured by the CPU 403 is equal to 336 [Kilobytes] as a value obtained by increasing 21 [Kilobytes] by 16 times.

(2) When B>200 [%]

The storage amount corresponding to one page of the image before the variable-magnification process at the threshold variable-magnification ratio of 200 [%] is assured as a second buffer storage amount.

The storage amount corresponding to one page of the image before the variable-magnification process at the threshold variable-magnification ratio of 200 [%] is considered as follows. Since the threshold variable-magnification ratio is equal to 200 [%], the number of pixels of the original image before the variable-magnification process is equal to ¼ of the number of pixels of the image of the A3 size and 600 [dpi]. That is, since it is equal to ¼ of 70 [Mega pixels], it is equal to 17.5 [Mega pixels]. Assuming that each color of RGB is equal to 1 byte and one pixel is equal to 3 bytes, the capacity of the buffer memory 402 which should be assured by the CPU 403 is equal to 52.5 [Mega pixels] as a value obtained by increasing 17.5 [Megabytes] by 3 times.

Figure 6:
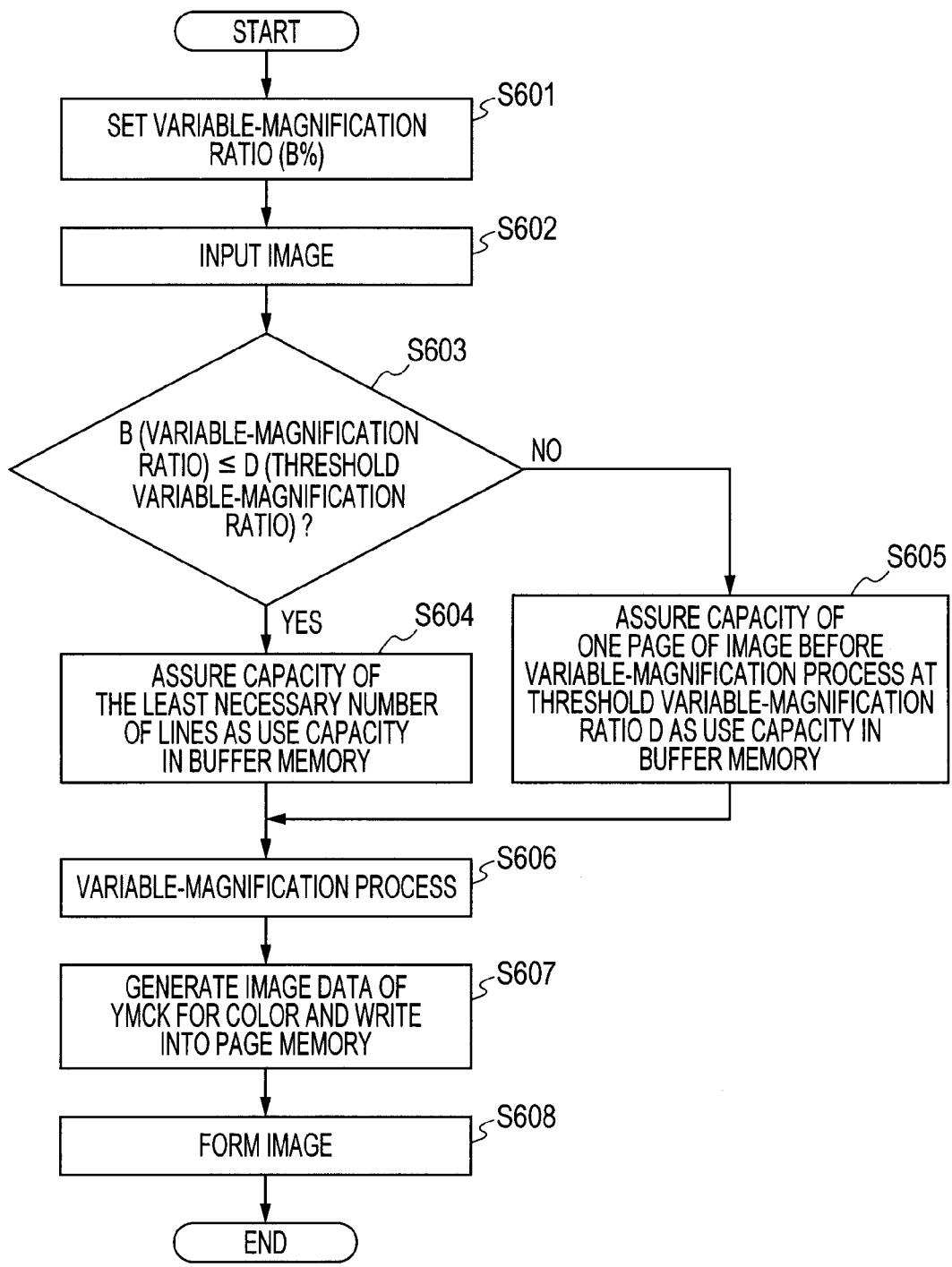
FIG. 6 is a flowchart illustrating a processing procedure of a color image creation according to the embodiment 1.

FIG. 6 is a flowchart illustrating a control example in a color image forming apparatus in which the image processing apparatus according to the embodiment 1 has been installed. The processing procedure will be described with reference to processing steps of the flowchart of FIG. 6.

First, in step S601, the CPU 403 sets the variable-magnification ratio into the variable-magnification processing unit 105 on the basis of the variable-magnification ratio B [%] set by the user of the image forming apparatus through a control panel 404 serving as a user interface. In step S602, the RGB image data based on the original image serving as an image to be formed is input by the image input unit 101. The input image data is sent to the variable-magnification processing unit 105 through the buffer memory 402. Step S602 may be executed before step S601.

In step S603, the CPU 403 discriminates whether or not the variable-magnification ratio B [%] set in step S601 is equal to or less than the threshold variable-magnification ratio D [%]. Since the upper limit variable-magnification ratio B'[%] which can be processed by the variable-magnification processing unit 105 can be preliminarily statically calculated by the equation (10) from performance of the image input unit 101 and performance of the variable-magnification processing unit 105, the threshold variable-magnification ratio D [%] which is decided by the inequality (11) can be also preliminarily decided. Therefore, as a threshold variable-magnification ratio D [%], the value which has previously been calculated by the external apparatus or the like may be held in the memory, register, or the like, or the CPU 403 may dynamically decide it. As a result of the discrimination of the CPU 403 in step S603, if the variable-magnification ratio B [%] set in step S601 is equal to or less than the threshold variable-magnification ratio D [%], step S604 follows. If NO, step S605 follows.

In step S604, the CPU 403 assures the storage amount corresponding to the necessary least number of lines as a use amount of the buffer memory 402. In step S605, the CPU 403 assures the storage amount corresponding to one page of the image before the variable-magnification process at the threshold variable-magnification ratio D as a use amount of the buffer memory 402.

In step S606, the variable-magnification processing unit 105 executes the variable-magnification process to the RGB image data which was input in step S602. The buffer memory 402 of the capacity assured in step S604 or S605 is used as a ring buffer and the image data is supplied to the variable-magnification processing unit 105 through the ring buffer.

In step S607, the color image forming YMCK image data formed by the image processing unit 401 is written into the page memory 109. In step S608, the color image forming YMCK image data stored in the page memory 109 is output to the image forming unit 103 and the image forming operation based on the image data is executed.

As described above, according to the color image forming apparatus of the embodiment, the CPU 403 switches the use amount of the buffer memory 402 in accordance with the variable-magnification ratio set from the control panel 404. Specifically speaking, if the variable-magnification ratio which is equal to or less than the threshold variable-magnification ratio was set, the storage amount corresponding to the necessary least number of lines is assured as a use amount of the buffer memory 402. If the variable-magnification ratio larger than the threshold variable-magnification ratio was set, the storage amount corresponding to one page of the image before the variable-magnification process at the threshold variable-magnification ratio is assured as a use amount of the buffer memory 402. Therefore, the scanning speed of the optical system (in the embodiment, feeding speed of the original) is held constant and even if the scanning speed of the optical system (in the embodiment, feeding speed of the original) is not controlled, when the variable-magnification ratio larger than the threshold variable-magnification ratio is set, the buffer memory 402 does not overflow.

As compared with the case where the storage amount corresponding to one page of the image before the variable-magnification process at the threshold variable-magnification ratio is always assured as a use amount of the buffer memory 402, if the variable-magnification ratio which is equal to or less than the threshold variable-magnification ratio was set, the use amount of the buffer memory 402 can be reduced.

Advantages will now be described based on the foregoing specific numerical values. The use amount is compared with that in the case of always assuring 52.5 [Megabytes] as a storage amount corresponding to one page of the image before the variable-magnification process at the threshold variable-magnification ratio of 200 [%]. In the embodiment, when the variable-magnification ratio exceeds 200 [%], 52.5 [Megabytes] as a storage amount corresponding to one page of the image before the variable-magnification process at the threshold variable-magnification ratio of 200 [%] is assured. When the variable-magnification ratio is equal to or less than 200 [%], 42 [Kilobytes], 336[Kilobytes], or the like as a storage amount corresponding to the necessary least number of lines is assured. Therefore, when the variable-magnification ratio which is equal to or less than 200 [%] is set, the use amount of the buffer memory 402 can be reduced.

<Embodiment 2>

Figure 7:
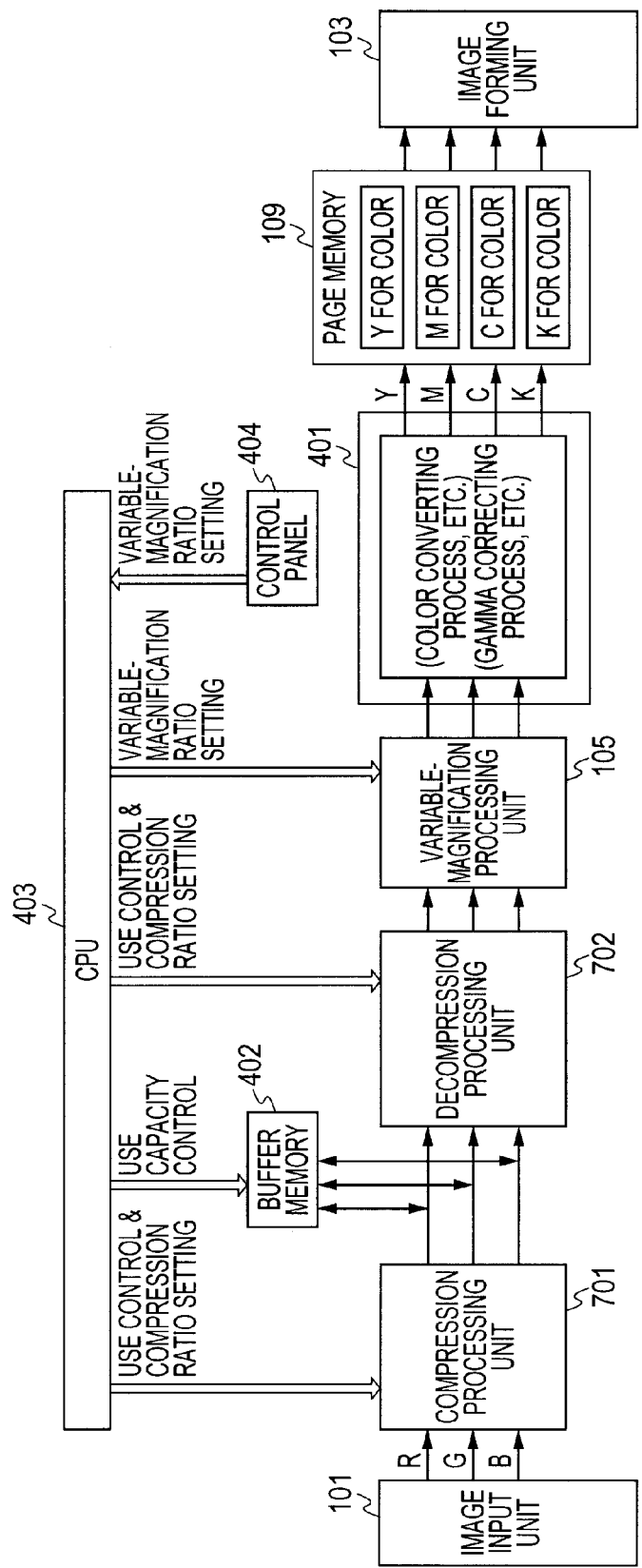
FIG. 7 is a functional block diagram of a color image forming apparatus according to the embodiment 2.

FIG. 7 is a functional block diagram of a color image forming apparatus in which an image processing apparatus according to the embodiment 2 has been installed. The embodiment 2 differs from the embodiment 1 with respect to a point that the apparatus further has a compression processing unit 701 for executing a compressing process and a decompression processing unit 702 for executing a decompressing process.

The compression processing unit 701 can execute the compressing process when the image data is written into the buffer memory 402. The decompression processing unit 702 can execute the decompressing process when the image data is read out of the buffer memory 402. In accordance with the variable-magnification ratio set from the control panel 404, the CPU 403 controls "use" or "non-use" of the compressing function by the compression processing unit 701 and the decompressing function by the decompression processing unit 702.

The difference from the embodiment 1 will be mainly described hereinbelow in order to further simplify the description. The variables A, A', B, B', C, D, E, F, G, H, and I which are necessary for description are defined in a manner similar to the embodiment 1.

In the embodiment 2, two kinds of using methods are presumed in the buffer memory 402. The first using method is used in the case where the buffer memory 402 is used as a ring buffer in which the RGB image data which was input from the image input unit 101 is temporarily stored in a format of the non-compression RAW data. The second using method is used in the case where the buffer memory 402 is used as a page memory in which the RGB image data which was input from the image input unit 101 is temporarily stored in a format of the code data compressed by the compression processing unit 701.

The CPU 403 switches the use amount of the buffer memory 402 in accordance with the variable-magnification ratio set from the control panel 404. In addition, the CPU 403 sets the variable-magnification ratio into the variable-magnification processing unit 105 in accordance with the variable-magnification ratio. Further, the CPU 403 serving as a compression/decompression use control unit decides "use" or "non-use" of the compression processing unit 701 and the decompression processing unit 702 in accordance with the variable-magnification ratio and decides a compression ratio in accordance with a buffer memory amount which can be used by the CPU 403 serving as a compression ratio setting unit when the units 701 and 702 are used.

In the embodiment, when the variable-magnification ratio set from the control panel 404 is equal to or less than the threshold variable-magnification ratio, the storage amount of the line memories corresponding to the necessary least number of lines is assured as a first buffer storage amount. When the variable-magnification ratio is larger than the threshold variable-magnification ratio, the capacity which is obtained after the image data corresponding to one page of the image before the variable-magnification process at the threshold variable-magnification ratio was compressed by the compression processing unit 701 is assured as a second buffer storage amount. The compression ratio in the compressing process is decided in accordance with the buffer memory amount which can be used. In the case of performing the compressing process by using, for example, an irreversible compression such as a JPEG standard or the like, by maximally using the buffer memory amount which can be used, assuring the second buffer storage amount as large as possible, and reducing the compression ratio, the deterioration in picture quality can be minimized.

Finally, the CPU 403 decides the use amount of the buffer memory 402 in accordance with the following reference.

(1) When $B \leq D$

The storage amount of the line memories corresponding to the necessary least number of lines is assured as a first buffer storage amount.

(2) When $B > D$

The capacity which is obtained after the image data corresponding to one page of the image before the variable-magnification process at the threshold variable-magnification ratio D was compressed by the compression processing unit 701 is assured as a second buffer storage amount.

The foregoing selection of the buffer memory capacity will now be described in detail by showing the specific numerical values.

For example, it is now assumed that the A3 scanner apparatus having the scan resolution of 600 [dpi] operates at a rate of 40 [images/minute] and at an image interval ratio of 30 [%] and the variable-magnification processing unit which can output the pixel every cycle operates at a clock frequency of 148 [MHz]. The "image interval ratio" is a terminology corresponding to the ratio (=(100−F) [%]) of the intervals of the read original images of the scanner apparatus. The number of pixels of the image of the A3 size and 600 [dpi] is assumed to be 70 [Mega pixels] (7000 [pixels]×10000 [pixels]). The above numerical values are identical to those in the embodiment 1.

Finally, the CPU 403 decides the use amount of the buffer memory 402 in accordance with the following reference.

(1) When $B \leq 200$ [%]

The storage amount of the line memories corresponding to the necessary least number of lines is assured as a first buffer storage amount. The storage amount corresponding to the necessary least number of lines is equal to the amount of 2 lines or 16 lines as mentioned above.

Assuming that each color of RGB is equal to 1 byte and one pixel is equal to 3 bytes, the memory capacity of one line is equal to 21000 [Bytes]=21 [Kilobytes] as a value obtained by increasing 7000 [pixels] by 3 times. Therefore, in the case of the storage amount of 2 lines, the capacity of the buffer memory 402 which should be assured by the CPU 403 is equal to 42 [Kilobytes] as a value obtained by increasing 21 [Kilobytes] by 2 times. In the case of the storage amount of 16 lines, the capacity of the buffer memory 402 which should be assured by the CPU 403 is equal to 336 [Kilobytes] as a value obtained by increasing 21 [Kilobytes] by 16 times.

(2) When B>200 [%]

The capacity which is obtained after the image data corresponding to one page of the image before the variable-magnification process at the threshold variable-magnification ratio of 200 [%] was compressed by the compression processing unit 701 is assured as a second buffer storage amount.

The storage amount corresponding to one page of the image before the variable-magnification process at the threshold variable-magnification ratio of 200 [%] is considered as follows. Since the threshold variable-magnification ratio is equal to 200 [%], the number of pixels of the original image before the variable-magnification process is equal to ¼ of the number of pixels of the image of the A3 size and 600 [dpi]. That is, since it is equal to ¼ of 70 [Mega pixels], it is equal to 17.5 [Mega pixels]. Assuming that each color of RGB is equal to 1 byte and one pixel is equal to 3 bytes, the memory capacity of one page of the image before the variable-magnification process is equal to 52.5 [Megabytes] as a value obtained by increasing 17.5 [Mega pixels] by 3 times. If the compression processing unit 701 is a JPEG encoder, the compression ratio of about 10% can be generally estimated in the JPEG standard. Therefore, the capacity of the buffer memory 402 which should be assured by the CPU 403 is equal to 5.25 [Megabytes] obtained by increasing 52.5 [Megabytes] by 0.1 time.

Figure 8:
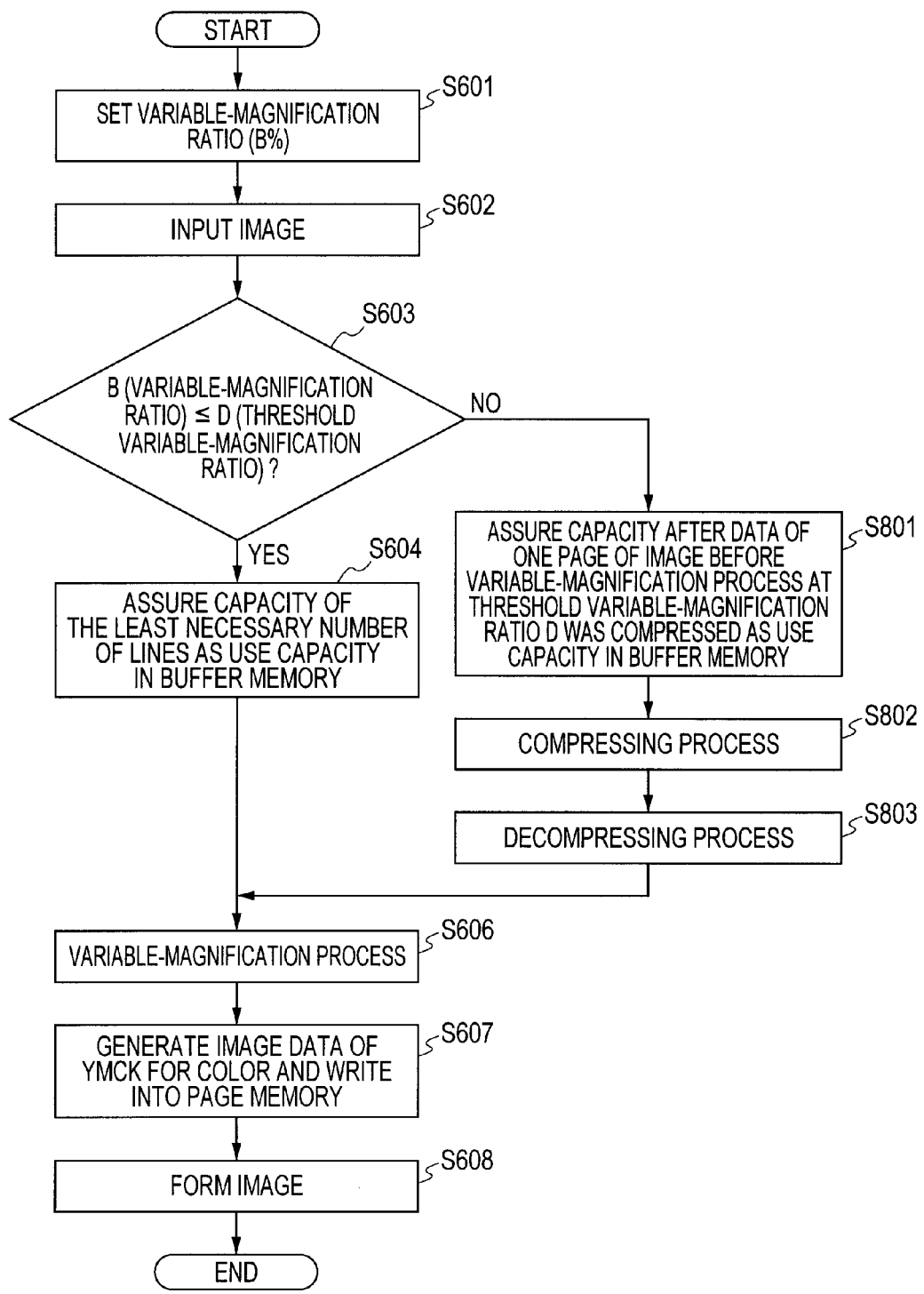
FIG. 8 is a flowchart illustrating a processing procedure of a color image creation according to the embodiment 2.

FIG. 8 is a flowchart illustrating a control example in the color image forming apparatus in which the image processing apparatus according to the embodiment 2 has been installed. The above processing procedure will be described with reference to the flowchart of FIG. 8 mainly with respect to the difference from the embodiment 1.

As a result of the discrimination by the CPU 403 in step S603, if the variable-magnification ratio B [%] set in step S601 is equal to or less than the threshold variable-magnification ratio D [%], step S604 follows. If NO, step S801 follows. In step S604, the CPU 403 assures the storage amount corresponding to the necessary least number of lines as a use amount of the buffer memory 402. In addition, the CPU 403 sets the compression processing unit 701 and the decompression processing unit 702 into "non-use", thereby enabling the RAW data to be handled in the buffer memory 402.

In step S801, the CPU 403 assures the capacity which is obtained after the image data corresponding to one page of the image before the variable-magnification process at the threshold variable-magnification ratio D was compressed by the compression processing unit 701 as a use amount of the buffer memory 402. In addition, the CPU 403 sets the compression processing unit 701 and the decompression processing unit 702 into "use", thereby enabling the code data to be handled in the buffer memory 402. When the image data is written into the buffer memory 402 having the capacity assured in step S801, the compression processing unit 701 executes the compressing process in step S802. When the image data is read out of the buffer memory 402 having the capacity assured in step S801, the decompression processing unit 702 executes the decompressing process in step S803.

In step S606, the variable-magnification processing unit 105 executes the variable-magnification process to the RGB image data which was input in step S602. The buffer memory 402 having the capacity assured in step S604 is used as a ring buffer and the image data is supplied to the variable-magnification processing unit 105 through the ring buffer. Or, the buffer memory 402 having the capacity assured in step S801 is used as a page memory and the image data is supplied to the variable-magnification processing unit 105 through the page memory.

As described above, in the color image forming apparatus according to the embodiment, the CPU 403 switches the use amount of the buffer memory 402 in accordance with the variable-magnification ratio set from the control panel 404. In accordance with the variable-magnification ratio set from the control panel 404, the CPU 403 further switches whether or not the compressing process and the decompressing process are executed by using the compression processing unit 701 and the decompression processing unit 702. Specifically speaking, when the variable-magnification ratio which is equal to or less than the threshold variable-magnification ratio is set, the storage amount corresponding to the necessary least number of lines is assured as a use amount of the buffer memory 402. When the variable-magnification ratio which is larger than the threshold variable-magnification ratio is set, the capacity which is obtained after the image data corresponding to one page of the image before the variable-magnification process at the threshold variable-magnification ratio was compressed by the compression processing unit 701 is assured as a use amount of the buffer memory 402. Therefore, the scanning speed of the optical system (in the embodiment, feeding speed of the original) is held constant and even if the scanning speed of the optical system (in the embodiment, feeding speed of the original) is not controlled, when the variable-magnification ratio larger than the threshold variable-magnification ratio is set, the buffer memory 402 does not overflow.

As compared with the case where the storage amount corresponding to one page of the image before the variable-magnification process at the threshold variable-magnification ratio is always assured as a use amount of the buffer memory 402, the use amount of the buffer memory 402 can be reduced.

Advantages will now be described based on the foregoing specific numerical values. The use amount is compared with the that in the case of always assuring 52.5 [Megabytes] as a storage amount corresponding to one page of the image before the variable-magnification process at the threshold variable-magnification ratio of 200 [%]. In the embodiment, when the variable-magnification ratio exceeds 200 [%], 52.5 [Megabytes] as a capacity which is obtained after the image data of one page of the image before the variable-magnification process at the threshold variable-magnification ratio of 200 [%] was compressed by the JPEG or the like is assured. When the variable-magnification ratio is equal to or less than 200 [%], 42 [Kilobytes], 336 [Kilobytes], or the like as a storage amount corresponding to the necessary least number of lines is assured. Therefore, the use amount of the buffer memory 402 can be reduced.

As compared with the case where the capacity which is obtained after the image data of one page of the image was compressed by the compression processing unit 701 is always assured as a use amount of the buffer memory 402, the use amount of the buffer memory 402 can be reduced.

Advantages will now be described based on the foregoing specific numerical values. Assuming that the number of pixels of the image of the A3 size and 600 [dpi] is equal to 70 [Mega pixels], each color of RGB is equal to byte, and one pixel is equal to 3 bytes, the memory capacity of one page of the image is equal to 210 [Megabytes] as a value obtained by increasing 70 [Mega pixels] by 3 times. If the compression processing unit 701 is the JPEG encoder, the compression ratio of about 10% can be generally estimated in the JPEG standard. Therefore, the capacity of the buffer memory 402 which should be assured by the CPU 403 is equal to 21 [Megabytes] obtained by increasing 210 [Megabytes] by 0.1 time. In the embodiment, when the variable-magnification ratio exceeds 200 [%], the image data corresponding to one page of the image before the variable-magnification process at the threshold variable-magnification ratio of 200 [%] is compressed by the JPEG or the like. When the variable-magnification ratio is equal to or less than 200 [%], the image data is not compressed by the JPEG or the like but the storage amount corresponding to the necessary least number of lines is assured and the RAW data is handled. Therefore, as mentioned above, it is sufficient to assure 5.25 [Megabytes] at most. As compared with the case of always assuring 21 [Megabytes] mentioned above, the use amount of the buffer memory 402 can be reduced.

<Embodiment 3>

Although the color image forming apparatuses have been illustrated in the embodiments 1 and 2, the image forming apparatus in which an image processing apparatus to which the invention is applied has been installed may be a monochromatic image forming apparatus.

Figure 9:
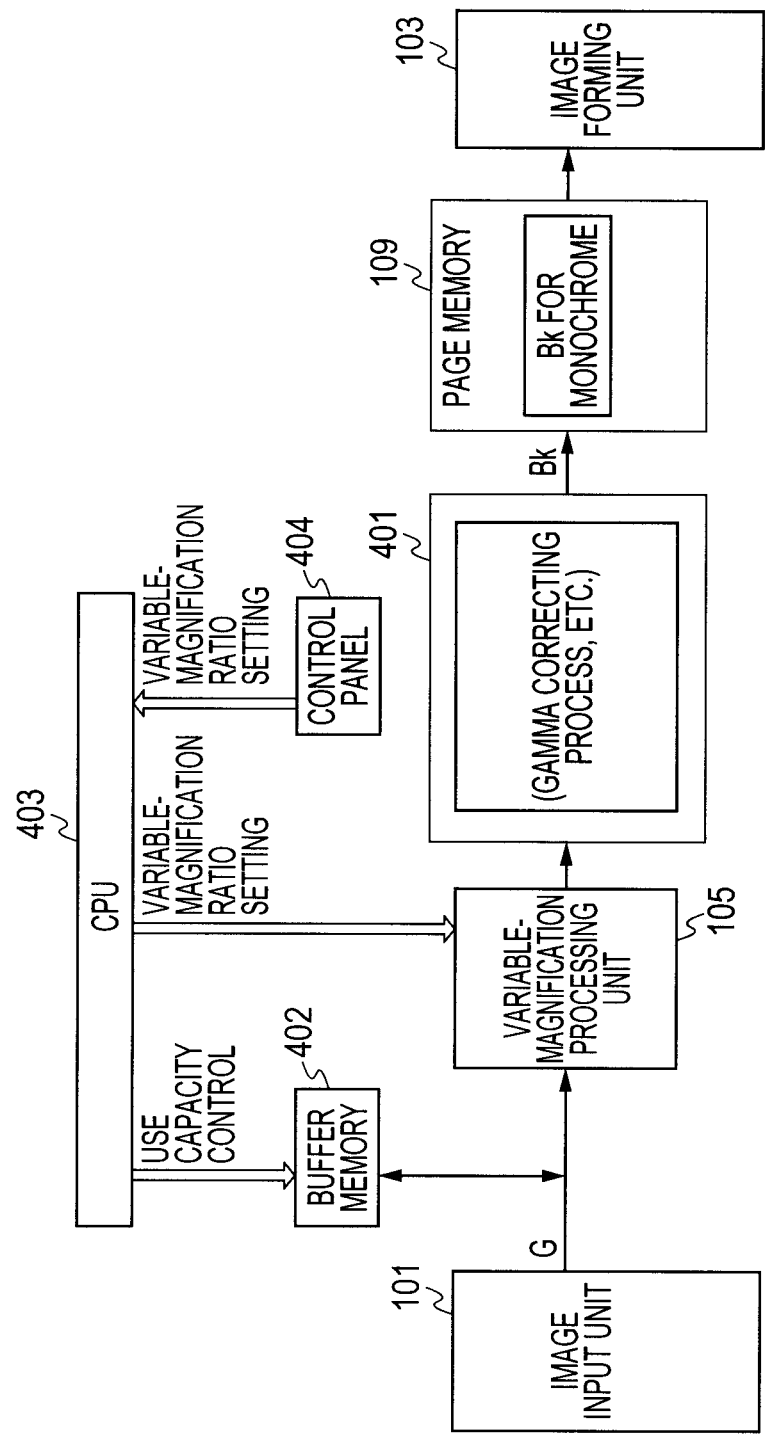
FIG. 9 is a functional block diagram of a monochromatic image forming apparatus according to the embodiment 3.

FIG. 9 is a functional block diagram of the monochromatic image forming apparatus in which an image processing apparatus according to the embodiment 3 has been installed. Generally, in the monochromatic image forming apparatus, for example, when the image input unit 101 is the scanner apparatus as illustrated in FIGS. 2 and 3, image data of only the G (green) color as a color component which is closest to a luminance value is input. Therefore, there is no need to perform a color space conversion in the image processing unit 401 and by performing a gamma correction to the image data of G (green), it is converted into image data of Bk (black).

<Embodiment 4>

Figure 10:
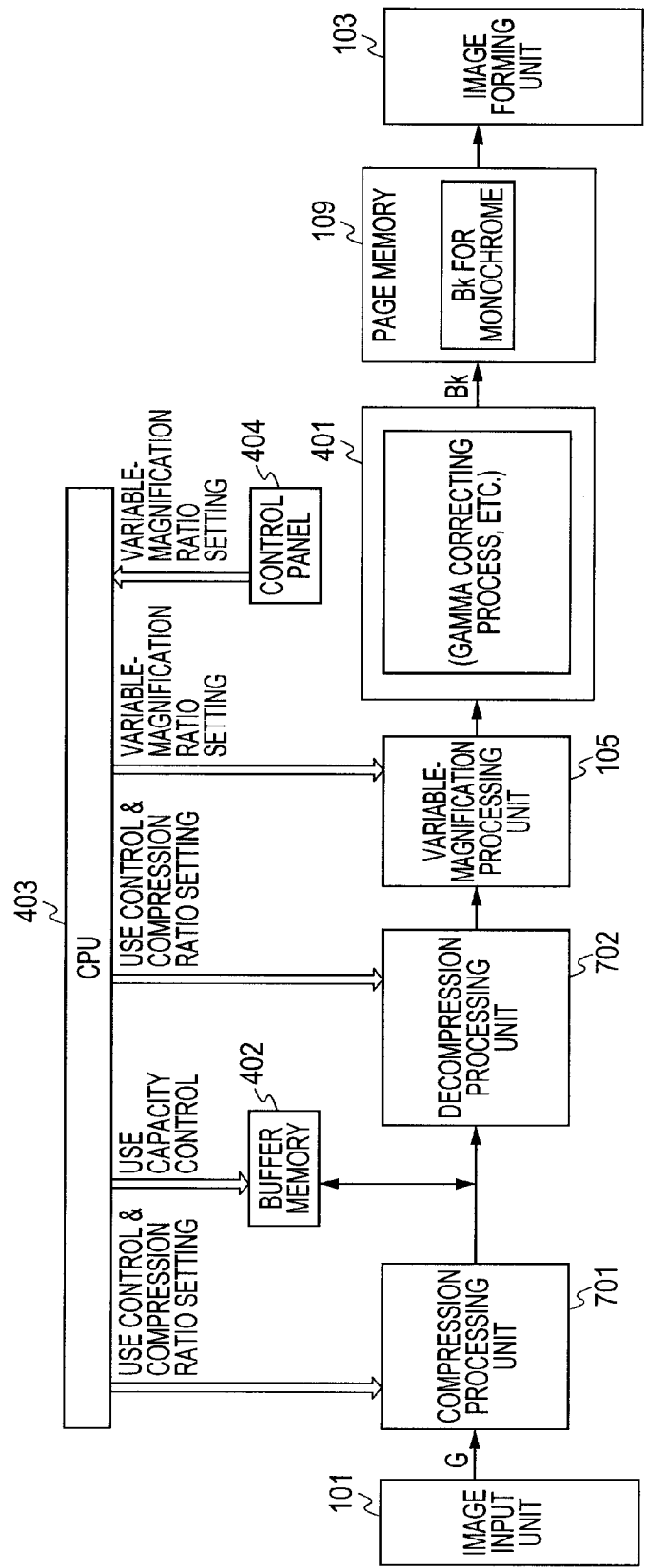
FIG. 10 is a functional block diagram of a monochromatic image forming apparatus according to the embodiment 4.

FIG. 10 is a functional block diagram of a monochromatic image forming apparatus in which an image processing apparatus according to the embodiment 4 has been installed. The embodiment 4 differs from the embodiment 3 with respect to a point that the apparatus further has the compression processing unit 701 and the decompression processing unit 702. The CPU 403 decides "use" or "non-use" of the compressing process by the compression processing unit 701 and the decompressing process by the decompression processing unit 702 in accordance with the variable-magnification ratio set from the control panel 404.

<Embodiment 5>

In an image processing apparatus according to the embodiment 5, the image input unit 101 has a communication function unit for receiving the image data of the image (to be formed) which has been transmitted from the external apparatus through the network having the real-time restriction and inputting the received image data. As a specific use case, a snapshot printing of a moving image during streaming is presumed.

Figure 11:
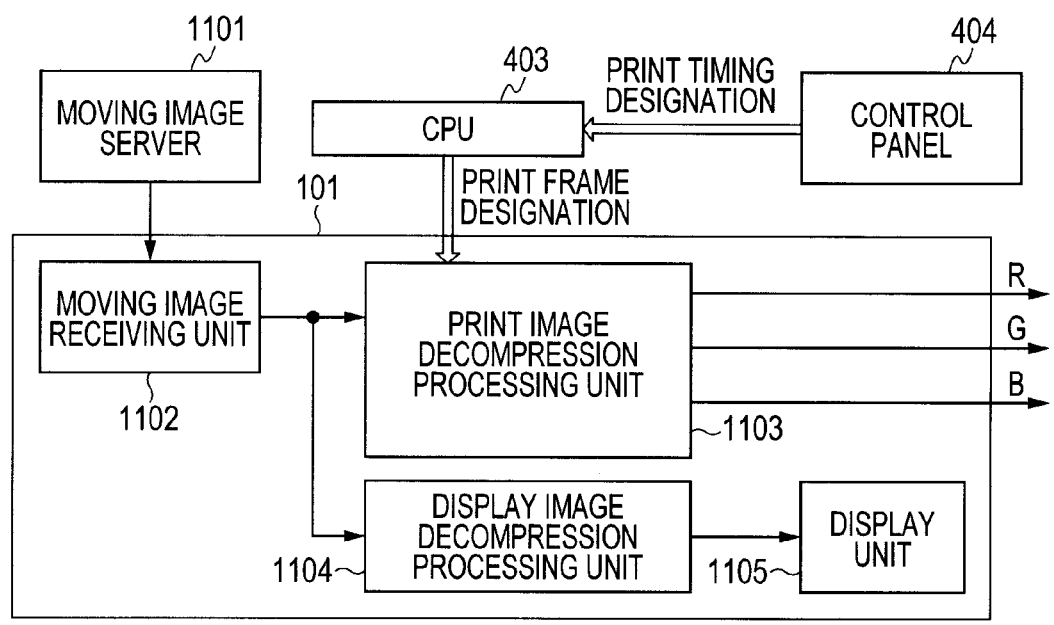
FIG. 11 is a functional block diagram of an image input unit according to the embodiment 5.

FIG. 11 is a functional block diagram of the image input unit 101 constructing a color image forming apparatus in which the image processing apparatus according to the embodiment 5 has been installed.

A moving image receiving unit 1102 receives moving image data which had been compressed by an MPEG or the like and was transmitted from a moving image server 1101 through the network and inputs the received moving image data to a print image decompression processing unit 1103 and a display image decompression processing unit 1104. The display image decompression processing unit 1104 executes a decompressing process for the display image to the compressed moving image data which was input and inputs the moving image data obtained after the decompressing process to a display unit 1105. The display unit 1105 is a liquid crystal display or the like for displaying the input moving image data obtained after the decompressing process. The print image decompression processing unit 1103 can execute the decompressing process to the compressed moving image data which was input, that is, only to a frame of the timing designated by the CPU 403 in a real-time manner. After completion of the decompressing process, for example, in the case of the color image forming apparatus illustrated in FIGS. 4 and 7, still image data corresponding to the designated frame is transmitted as RGB print data to the image processing unit 102, thereby realizing the snapshot printing.

The user refers to the moving image displayed on the display unit 1105 and designates print timing at arbitrary timing through the control panel 404. The CPU 403 adjusts timing for the moving image which is displayed on the display unit 1105 and timing for designation of a print frame which is notified to the print image decompression processing unit 1103 and designates the frame corresponding to the timing designated by the user with reference to the display unit 1105 to the print image decompression processing unit.

In order to perform the snapshot printing of the moving image during the streaming as mentioned above, it is necessary to execute a series of processes in a range from the reception of the moving image to the decompressing process in a real-time manner. Therefore, the image input unit 101 cannot reduce the communication speed upon inputting of the print data to the image processing unit 102 on the way of the process and cannot temporarily stop the communication of the input of the print data to the image processing unit 102 either.

In the embodiment, a process for deciding the upper limit variable-magnification ratio B' which can be processed by the variable-magnification processing unit 105 will now be described by using the foregoing numerical expressions. It is assumed that the variables A, A', B, B', C, D, E, F, G, H, and I which are necessary for description are defined in a manner similar to the embodiment 1.

Different from the embodiments 1 to 4 in which the image input unit 101 is the scanner apparatus, the communication speed A of the image input unit 101 is determined irrespective of the variable-magnification ratio B of the variable-magnification processing unit 105.

Figure 12:
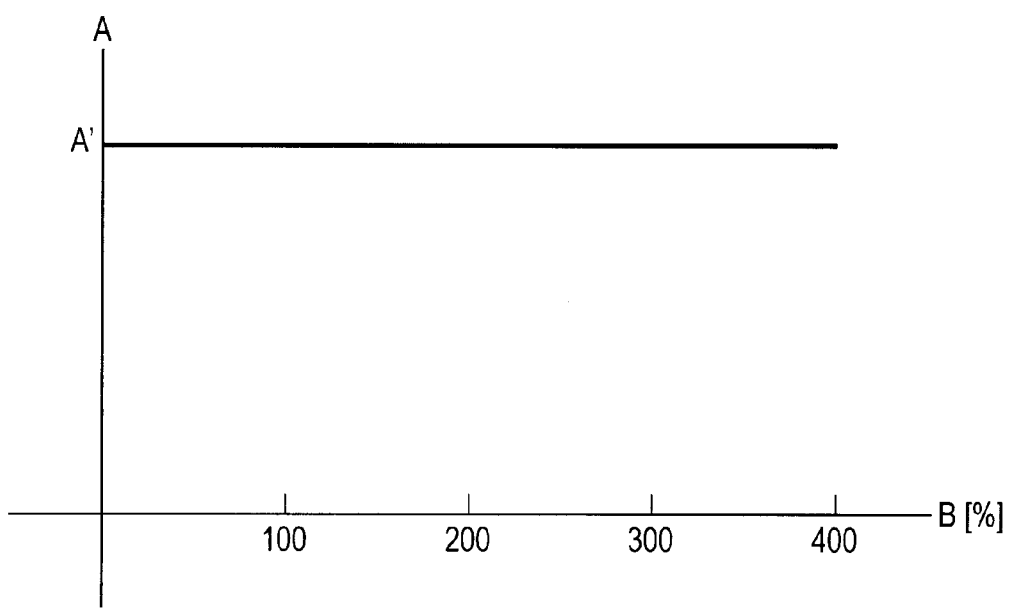
FIG. 12 is a graph illustrating a relation between a communication speed A of an image input unit and a variable-magnification ratio B of a variable-magnification processing unit in an image forming apparatus according to the embodiment 5.

FIG. 12 is a graph illustrating a relation between the communication speed A of the image input unit 101 and the variable-magnification ratio B of the variable-magnification processing unit 105.

When the communication speed A of the image input unit 101 is equal to the maximum speed A', the communication speed which is required on the output side of the variable-magnification processing unit 105 is obtained by the following expression (12).

$$A' \times (B/100) \times (B/100) \tag{12}$$

Since the communication speed which is required on the output side of the variable-magnification processing unit 105 and shown by the expression (12) must not exceed the maximum communication speed C on the output side of the variable-magnification processing unit 105 which is shown by the equation (4), it is necessary that the variable-magnification ratio B of the variable-magnification processing unit 105 satisfies the following inequality (13) whose left side is the expression (12).

$$A' \times (B/100) \times (B/100) \leq C \tag{13}$$

From the inequality (13), as the variable-magnification ratio B of the variable-magnification processing unit 105 increases, an inequality sign of the inequality (13) is reversed at the threshold value of a certain variable-magnification ratio B as a boundary. That is, the communication speed exceeds the maximum communication speed C of the output side of the variable-magnification processing unit 105. In other words, the processing ability exceeds the upper limit of the processing ability of the output side of the variable-magnification processing unit 105. It is, therefore, necessary to reduce the communication speed A of the image input unit 101 so as to satisfy the inequality (13). However, since the communication from the image input unit 101 has the real-time restriction, the communication speed cannot be temporarily reduced or the communication cannot be stopped. It is impossible to satisfy the inequality (13).

Therefore, the variable-magnification ratio B which satisfies the following equation (14) in which the right side and the left side of the inequality (13) are equal becomes the upper limit variable-magnification ratio B' which can be processed by the variable-magnification processing unit 105.

$$A' \times (B'/100) \times (B'/100) = C \quad (14)$$

That is, the variable-magnification ratio at the time when a value obtained by multiplying the maximum communication speed of the image input unit 101 by the square of the variable-magnification ratio of the variable-magnification processing unit 105 is equal to the maximum communication speed C of the output side of the variable-magnification processing unit 105 becomes the upper limit variable-magnification ratio B' which can be processed by the variable-magnification processing unit 105.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-202882, filed Sep. 10, 2010, which is hereby incorporated by reference herein in its entirety.

What is claimed is:

1. An image processing apparatus comprising:
an input unit configured to input image data;
a setting unit configured to set a variable-magnification ratio of the image data;
a discriminating unit configured to discriminate whether or not the variable-magnification ratio set by the setting unit is larger than a predetermined threshold value,
a reserving unit configured to reserve a memory having a memory capacity determined in accordance with the variable-magnification ratio set by the setting unit, wherein if the discrimination result by the discriminating unit shows that the variable-magnification ratio set by the setting unit is larger than the predetermined threshold value, the memory capacity is determined to have a value larger than that in the case where the variable-magnification ratio is equal to or less than the predetermined threshold value;
a storing unit configured to store at least a portion of the image data into the memory reserved by the reserving unit; and
a variable-magnification processing unit configured to execute a variable-magnification process to the image data stored in the memory by using the variable-magnification ratio set by the setting unit;
a first threshold value deciding unit configured to decide an upper limit variable-magnification ratio such that a value obtained by multiplying a maximum communication speed of the input unit by the variable-magnification ratio of the variable-magnification processing unit is equal to a maximum communication speed on an output side of the variable-magnification processing unit, and to decide the threshold value within a range which is equal to or less than the upper limit variable-magnification ratio; and
a first threshold value storing unit configured to store the threshold value decided by the first threshold value deciding unit.

2. An apparatus according to claim 1, further comprising:
a compressing unit configured to execute a compressing process before the image data is stored into the memory;
a decompressing unit configured to execute a decompressing process to the image data read out of the memory;
a compression/decompression use control unit configured to switch use or non-use of the compressing unit and the decompressing unit in accordance with the variable-magnification ratio set by the setting unit; and
a compression ratio setting unit configured to set a compression ratio of each of the compressing unit and the decompressing unit.

3. An apparatus according to claim 1, further comprising:
a second threshold value deciding unit configured to decide an upper limit of such a variable-magnification ratio that a value obtained by multiplying a maximum communication speed of the input unit by a square of the variable-magnification ratio of the variable-magnification processing unit is equal to a maximum communication speed on an output side of the variable-magnification processing unit and deciding the threshold value within a range which is equal to or less than an upper limit of the variable-magnification ratio; and
a second threshold value storing unit configured to store the threshold value decided by the second threshold value deciding unit.

4. An apparatus according to claim 2, wherein when the variable-magnification ratio set by the setting unit is smaller than the predetermined threshold value, the compression/decompression use control unit does not use the compressing unit and the decompressing unit, and when the variable-magnification ratio is larger than the predetermined threshold value, the compression/decompression use control unit uses the compressing unit and the decompressing unit.

5. An apparatus according to claim 1, wherein the memory is a ring buffer.

6. An apparatus according to claim 1, wherein if the discrimination result by the discriminating unit shows that the variable-magnification ratio set by the setting unit is larger than the predetermined threshold value, the memory capacity is determined to have a value equal to a capacity of a page memory for storing the image data of one page.

7. An apparatus according to claim 1, wherein the input unit is a scanner apparatus using a linear image sensor.

8. An apparatus according to claim 1, wherein the input unit receives moving image data from a moving image server through a network, forms a still image corresponding to a frame at predetermined timing of the moving image data, and inputs the still image.

9. An image processing method carried out in an image processing apparatus, the image processing method comprising:

inputting image data;

setting a variable-magnification ratio of the image data;

discriminating whether or not the set variable-magnification ratio is larger than a predetermined threshold value;

reserving a memory having a memory capacity determined in accordance with the set variable-magnification ratio, wherein if the discrimination result shows that the set variable-magnification ratio is larger than the predetermined threshold value, the memory capacity is determined to have a value larger than that in the case where the variable-magnification ratio is equal to or less than the predetermined threshold value;

storing at least a portion of the image data into the reserved memory;

executing a variable-magnification process to the image data stored in the memory by using the set variable-magnification ratio;

deciding an upper limit variable-magnification ratio, using a first threshold value deciding step, such that a value obtained by multiplying a maximum communication speed of input of the image data by the variable-magnification ratio of the variable-magnification process is equal to a maximum communication speed on an output side of the variable-magnification process, and deciding the threshold value within a range which is equal to or less than the upper limit variable-magnification ratio; and storing the threshold value decided by the first threshold value deciding step.

10. A non-transitory computer-readable storage medium storing a computer-executable program for causing a computer to execute the method according to claim 9.

* * * * *